United States Patent

Sato et al.

[11] 4,090,656
[45] May 23, 1978

[54] SOLDERING IRON AND METHOD FOR SOLDERING A PLURALITY OF WIRES TO A CONNECTOR

[75] Inventors: Shoichi Sato; Shizuo Oda, both of Mooka, Japan

[73] Assignee: Bunker Ramo Corporation, Oak Brook, Ill.

[21] Appl. No.: 759,913

[22] Filed: Jan. 17, 1977

Related U.S. Application Data

[63] Continuation of Ser. No. 536,661, Dec. 26, 1974, abandoned.

[30] Foreign Application Priority Data

Jan. 25, 1974 Japan ............................ 49-10446[U]

[51] Int. Cl.² ........................... B23K 1/12; B23K 3/02
[52] U.S. Cl. .................................. 228/180 R; 228/54
[58] Field of Search ................ 228/180 R, 51, 54, 55, 228/180 A

[56] References Cited

U.S. PATENT DOCUMENTS

| | | | |
|---|---|---|---|
| 1,434,289 | 10/1922 | Heacox | 228/51 |
| 3,050,612 | 8/1962 | Eversole | 228/51 X |
| 3,584,190 | 6/1971 | Marcoux | 228/51 X |
| 3,589,591 | 8/1969 | Schwenn | 228/180 R X |
| 3,619,896 | 11/1971 | Paine | 228/180 A |
| 3,746,239 | 7/1973 | Auray | 228/51 X |
| 3,804,667 | 4/1974 | Halstead | 228/54 X |
| 3,943,323 | 3/1976 | Smith et al. | 228/54 X |

*Primary Examiner*—Al Lawrence Smith
*Assistant Examiner*—K. J. Ramsey
*Attorney, Agent, or Firm*—William Lohff; F. M. Arbuckle

[57] ABSTRACT

A soldering iron for soldering a plurality of wires to metal liners in respective channels of a connector. The soldering iron can be used with a known wire positioning device. The iron is made from a plate of heat conducting material. A plurality of projections extend fron an end face of the plate. The projections are spaced to correspond to the spacing of the metal liners in the channels of the connector which is being joined to the plurality of conductors. The sides of the projections converge toward the extremities of the projections. These converging sides are plated with a material to prevent oxidation and to cause the solder to wet the sides. The projections are dimensioned so that their extremities can be positioned within the channels while the converging sides contact respective edges of the metal liners in the channels. In such position, heat is conducted by the iron in order to solder the wires placed within the channels to the metal liners.

11 Claims, 11 Drawing Figures

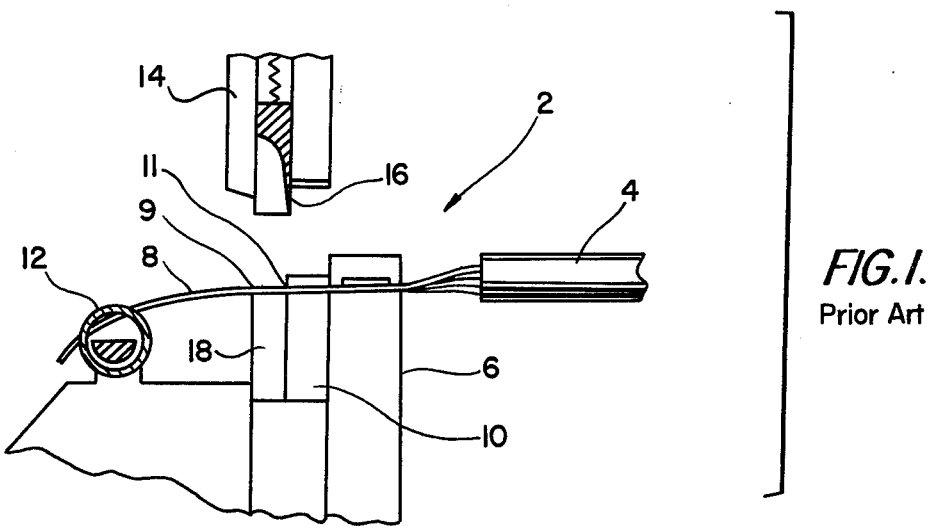
FIG. 1.
Prior Art
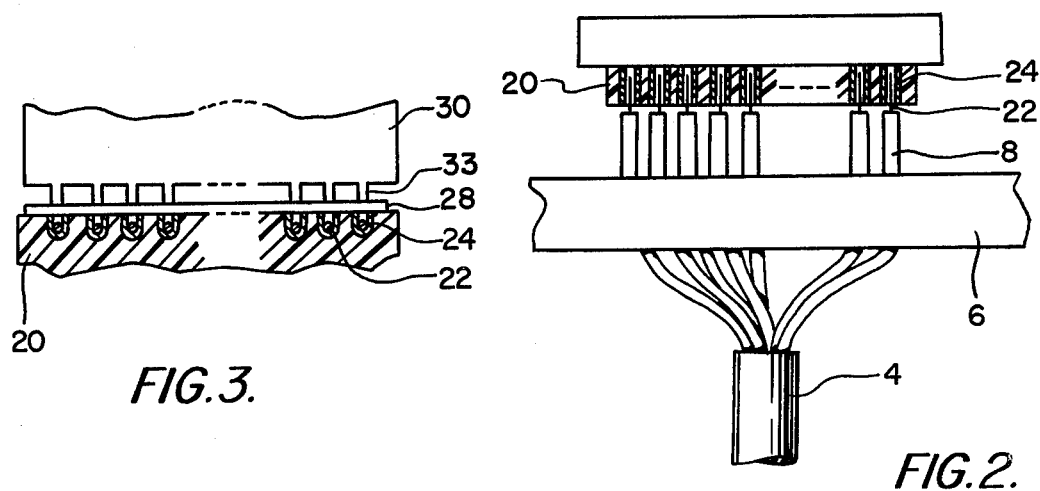
FIG. 3.
FIG. 2.
Prior Art
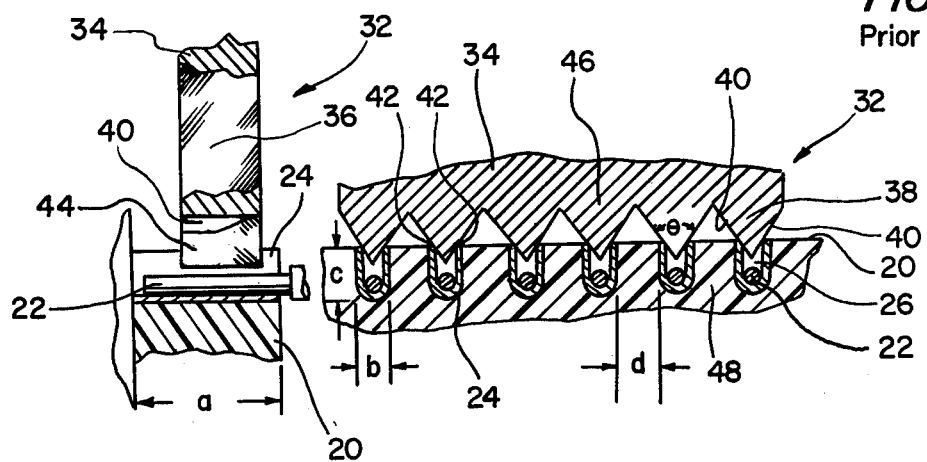
FIG. 4b.
FIG. 4a.

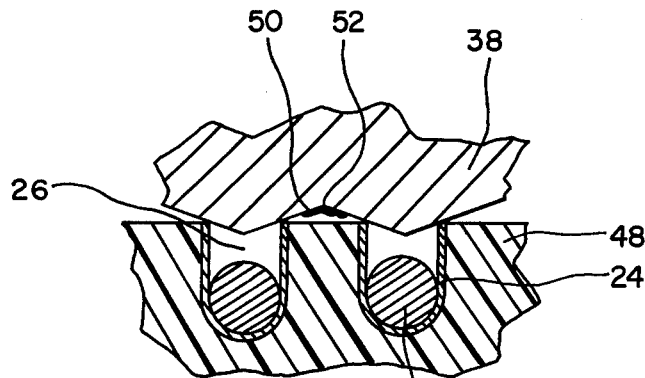
FIG. 5.
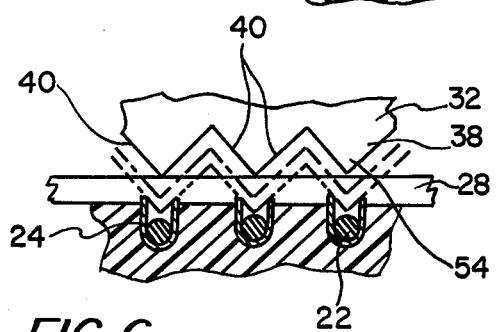
FIG. 6.
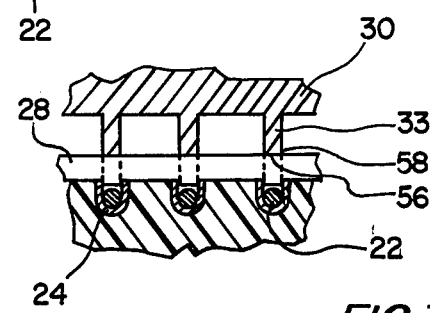
FIG. 7.
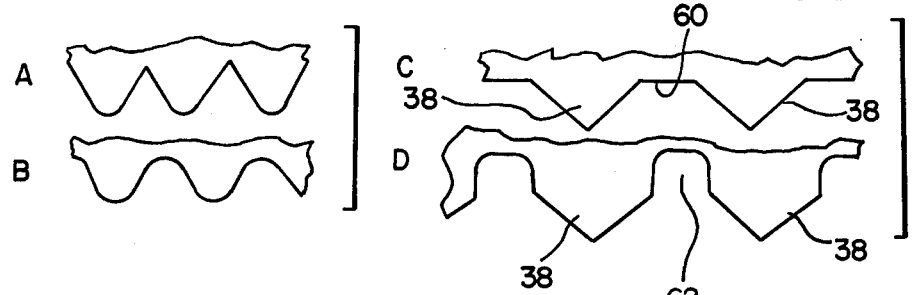
FIG. 8.
FIG. 9.
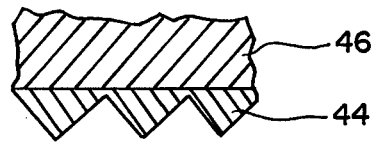
FIG. 10.

SOLDERING IRON AND METHOD FOR SOLDERING A PLURALITY OF WIRES TO A CONNECTOR

This is a continuation of application Ser. No. 536,661, filed Dec. 26, 1974, now abandoned.

BACKGROUND OF THE INVENTION

This invention relates to soldering irons and a method for soldering wires to a connector, and particularly to a soldering iron and a method for simultaneously soldering a plurality of wires to metal liners in channels of a connector.

In the past, various methods of hand soldering have been adopted for connecting wires to multi-core connectors which are widely used in electronic devices. For example, in one method the coverings of wires are peeled off one by one and then the wires are applied and soldered one by one to each metal liner in the connector. Another example is a method in which wires (to which solder has already been applied) are placed in metal liners (to which solder has been applied) and each wire is soldered one at a time to the inside of its encompassing liner by melting the previously applied solder with a soldering iron. These methods are inefficient and require great skill in order to accomplish reliable and neat soldering.

A wire positioning device recently came into use which positions the connecting wires parallel and at the proper distances apart so as to match the corresponding metal liners in the multi-core connector. The wire positioning device automatically cuts the wires, strips off the wire coverings, and places the stripped conductor of the wires into each metal liner, thus sharply reducing the painstaking nature of the work at the time of soldering. However, the wires which have been automatically stripped and positioned by the wire positioning device must still be hand-soldered one at a time to the metal liners. Such hand soldering lacks efficiency and uniform high quality.

SUMMARY OF THE INVENTION

It is an object of the invention to provide a soldering iron which can automatically and simultaneously solder a plurality of wires to metal liners in respective channels in a connector. According to the invention, a plate of heat conducting material is provided with a plurality of projections on an end face. The projections are spaced to correspond to the spacing of the metal liners in the channels of the connector. The sides of each of the projections converge toward the extremity of the projection. The projections are dimensioned so that their extremities can be positioned within the metal lined channels so that their converging sides contact respective edges of the metal liners. Thus, the soldering iron can conduct heat to solder the wires placed within the channels to the corresponding metal liners. The converging sides of the projections are plated with material which prevents oxidation and causes the solder to wet the converging sides.

BRIEF DESCRIPTION OF THE DRAWINGS

The invention will now be described in detail with reference to the accompanying drawings representing preferred embodiments of the soldering iron according to the present invention. In the drawings:

FIG. 1 is a partial side view of a known wire positioning device suitable for use with the soldering iron of the invention;

FIG. 2 is a top view of wires positioned in a connector by means of the wire positioning device shown in FIG. 1;

FIG. 3 is a partial cross-sectional end view of a soldering iron having rectangular projections which is shown for comparison with the soldering iron of this invention;

FIGS. 4a and 4b show partial cross-sections in an end view and a side view, respectively, of a soldering iron according to the invention;

FIG. 5 is a partial cross-sectional end view of one embodiment of the soldering iron of this invention;

FIG. 6 is a partial cross-sectional end view showing the use of the soldering iron of this invention;

FIG. 7 is a partial cross-sectional end view of the soldering iron of FIG. 3 having rectangular projections;

FIG. 8 is a side view of two different configurations A and B, of projections having curved sides according to embodiments of the invention;

FIG. 9 is a side view of two different configurations, C and D, of spaced apart projections according to embodiments of this invention; and FIG. 10 is a partial side view of a soldering iron showing its plated surfaces according to an embodiment of this invention.

DESCRIPTION OF THE PREFERRED EMBODIMENTS

The soldering iron of this invention can be used with a known wire positioning device 2 such as shown in FIG. 1. In this device, a multi-wire cord 4 is attached to a positioning stand 6, and each individual wire 8 is inserted into a groove of an alignment jig 10 which has grooves at intervals corresponding to the intervals at which the wires will be joined to a connector. The ends of the wires are held by a wire holder 12. In this fashion, the wires are lined up and held. Then a cutting blade 14 and a stripping blade 16 are automatically lowered onto a receiving stand 18. The wires 8 are cut at location 9, and at location 11 the stripping blade 16 cuts into the wire coverings. With the stripping blade 16 still lowered, the positioning stand 6 is moved and the wire coverings are pulled off by the stripping blade.

Next, the cutting blade 14, the stripping blade 16, the alignment jig 10 and the receiving stand 18 are moved out of the way. Then, a connector 20 is automatically positioned and the positioning stand 6 is returned to its original position so that the conductors of the stripped wires 22 are applied to the connector 20 as shown in FIG. 2. Thus the operations needed for the connection of wires 8 to the connector 20 are greatly reduced by use of the wire positioning device 2.

However, the soldering of the wires to the connector is still done by hand, and therefore the process is still inefficient and uniformly soldered joints are difficult to obtain. Consequently, a soldering iron is needed which solders these multiple wires automatically and simultaneously. FIG. 3 shows a proposed automatic soldering iron which was not completely satisfactory, and is described for comparison and better understanding of the soldering iron of this invention. As shown in FIG. 3, conductors of the stripped wires 22 are placed in metal liners 24 in channels 26 in the connector 20, and solder 28 is placed over the top of the liners 24. The soldering iron 30 has rectangular shaped projections 33 at intervals corresponding with the metal liners 24, and these projections 33 are of such width and length that they can be lowered into the metal liners. This soldering iron 30 is lowered automatically onto the solder 28 and melts the solder thus attaching the wires 8 to the metal liners 24 of the connector 20 simultaneously and automatically. However, a soldering iron of such a structure has shortcomings. For example, the amounts of solder getting into the metal liners are not only small but also not uniform. In the worst cases, some metal liners get little solder, thus making reliable soldering difficult. Also, the life of the soldering iron is short and quite unsatisfactory.

FIGS. 4a and 4b show the front view and the side view of a section of the iron of the present invention. The iron 32 is a plate 34 which has a heating section 36 and projections 38 at the end. Each of the projections 38 has two converging sides 40 which appear as sides of a triangle in FIG. 4a. The converging sides 40 come into contact with the edges 42 of the metal liner 24 positioned in the channels 26 of the connector 20. The surfaces of the converging sides 40 are plated with material such as electroless nickel 44 which prevent oxidation and to which solder adheres easily (wets). The remaining surfaces of the iron 32, including the non-converging sides of the projections are plated with material such as hard chrome 46 which also prevents oxidation but is not wet by solder.

According to the results of experiments using the iron 32 of the above structure, the best soldering results were obtained when the angle $\theta$ formed by the two converging sides 40 of a projection 38 was 80° when the metal liners 24 were arranged in the insulating material 48 at intervals "d" of 0.8mm, and the length "a" of the metal liner was 5.5mm, the width "b" was 1.4mm, and the height "c" was 1.0mm. The conductor of the stripped wire 22 has an outer diameter of 0.5mm.

Bad soldering resulted due to delayed heat conduction when the angle $\theta$ was small and the converging sides 40 of the projections 38 were no longer in contact with the edges 42 of the metal liners 24. Also, it was found that as the angle $\theta$ was gradually made larger the soldering results became gradually worse. However, the results were satisfactory for practical use as long as molten solder 50 (as shown in FIG. 5) which adhered to the surface near the base 52 of the converging sides did not get too close and burn the insulating material 48 of the insulating barriers between the metal liners 24. As illustrated in FIGS. 5 and 6, the converging sides 40 extend beyond edges 42 and are spaced from the insulating material 48 to avoid engagement by the iron and burning of the material.

The life of the iron 32 with projections 38 having converging sides 40 is also longer than for the iron 30 with rectangular projections 32. The material stock used for the iron was a copper plate with a thickness of 4mm, the heating temperature was 300° C, and the solder was a stick solder (with a core of activated flux made of 60% tin and 40% lead. The thickness of the electroless nickel plating was 40$\mu$ and the thickness of the hard chrome plating was 30$\mu$.

Although the reasons for the superiority of the iron with projections as in our design over the iron with rectangular projections are not quite clear, the following has been deduced. When, as shown in FIG. 6, the iron 32 presses initially (position indicated by the solid line in the figure) on the solder 28 which is laid over the metal liners 24, the tips 54 of the projections 38 first start to melt and cut into the solder. As the projections 38 proceed, the converging sides 40 gradually enter into and melt the solder 28 as indicated in FIG. 6 by means of broken lines alternating with single dashes. Therefore, the full length of the solder is melted and it adheres to the full length of the converging sides 40 evenly. Since the surfaces of the converging sides 40 are plated with electroless nickel 44 which is wet easily by solder, and the rest of the iron is plated with hard chrome plating which is not wet easily by solder, the solder adheres to the slanted sides evenly and well.

When the converging sides 40 make contact with the edges 42 of the metal liners 24 as indicated in FIG. 6 by means of broken lines alternating with double dashes, the metal liners 24 which have small heat capacity compared to the conductors of the stripped wires 22 are heated rapidly. As the temperature of the metal liners rises, the solder adhering to the converging sides 40 slides down along the converging sides 40 and runs into each metal liner 24 in even quantities. Thus the conductors of stripped wires 22 become surrounded by the solder and by application of heat the soldering is accomplished.

On the other hand, in the case of the iron 30 with rectangular projections 33, the iron 30 makes contact with the solder mainly at the terminal planes 56 of the rectangular projections 33 as shown in FIG. 7. Moreover, the vertical sides 58 of the rectangular projections cut into the solder perpendicular to its alignment, so that only a vertical cross-section of the solder comes into contact with the iron. Therefore, the solder is heated only locally and not throughout its total length as is the case with the iron 32 with triangular projections 38. Such local heating results in small amounts of solder adhering to the projections 33 and therefore only small amounts of solder flow around the wires 22. Accordingly, wasted solder is left on the metal liners after soldering. Although quantities of solder adhere to the terminal planes 56 of the iron 30 with rectangular projections 33, the flow of this solder onto the wires 22 is not good because of the horizontal positions of the terminal plane.

In addition, the flow of solder onto the wires 22 is greatly influenced by the surface conditions of the terminal planes 56 and of the wires 22 thus resulting in uneven quantities of solder flow. Therefore, even and reliable soldering is difficult. Also, the solder accumulates on the iron with repeated soldering and this accumulated solder flows suddenly onto the wires when the accumulation has exceeded a certain amount. This makes the soldering of uniform quality difficult.

In addition to projections 38 having converging sides 40 forming a triangle, other embodiments within the scope of the invention can utilize converging sides which are curved as shown in FIG. 8 (A and B).

Also, in a case in which the intervals between the metal liners are large, planar spaces 60 can be provided between the projections as shown in FIG. 9(C). In this case, however, it is desired that solder not adhere to the flat sections. A structure with gutters 62 at the base of the projections as in FIG. 9(D) is also possible.

Although in the experimental example (outlined in detail previously) only the converging sides of the projections were plated with electroless nickel, if solder is not likely to adhere to the iron except on the converging sides because of the shape of the iron (for example, when the iron is much thicker than the strip of solder is wide), then the entire projection 38 can be plated with electroless nickel 44 as shown in FIG. 10. The rest of the iron should be plated with hard chrome 46 to make the plating process easier.

From the foregoing, it can be readily realized that this invention can assume various embodiments. Thus, it is to be understood that the invention is not limited to the specific embodiments described herein, but is to be limited only by the appended claims.

The embodiments of the invention in which an exclusive property or privilege is claimed are defined as follows:

1. An iron for simultaneously soldering a plurality of conductors to spaced metal liners positioned in respective channels of a connector and between barriers of insulation material, said iron comprising:
   a plate of heat conducting material;
   a plurality of projections on an end face of said plate, said projections being spaced to align with the channels of the connector and including sides that converge toward the outer extremities thereof, each said projection being dimensioned such that the extremity thereof may be positioned within one of said channels with said converging sides in contact with respective edges of the metal liner but spaced from said barriers between said channels; and
   means for directing molten solder into said channels and away from said barriers;
   whereby heat is conducted by said iron to the metal liners to solder the conductors thereto and the barriers of insulating material are not thermally degraded.

2. An iron for simultaneously soldering a plurality of conductors to spaced metal liners positioned in respective channels of a connector and between barriers of insulation material, said iron comprising:
   a plate of heat conducting material;
   a plurality of projections on an end face of said plate, said projections having a sinusoidal cross-section and being spaced to align with the channels of the connector and including sides that converge toward the outer extremities thereof, each said projection being dimensioned such that the extremity thereof may be positioned within one of said channels with said converging sides in contact with respective edges of the metal liner but spaced from said barriers between said channels;
   whereby heat is conducted by said iron to the metal liners to solder the conductors thereto and the barriers of insulating material are not engaged by the iron.

3. An iron for simultaneously soldering a plurality of conductors to spaced metal liners positioned in respective channels of a connector and between barriers of insulation material, said iron comprising:
   a plate of heat conducting material;
   a plurality of projections on an end face of said plate, said projections being spaced to align with the channels of the connector and including sides that converge toward the outer extremities thereof, each said projection being dimensioned such that the extremity thereof may be positioned within one of said channels with said converging sides in contact with respective edges of the metal liner but spaced from said barriers between said channels;
   whereby heat is conducted by said iron to the metal liners to solder the conductors thereto and the barriers of insulating material are not engaged by the iron; and
   wherein the surfaces of said converging sides are plated with a material to prevent oxidation and to cause the solder to wet the sides and wherein the other surfaces of said plate are plated with a second material to prevent oxidation and to prevent wetting by the solder.

4. The iron as claimed in claim 3, wherein said first-mentioned plated material comprises electroless nickel, and said second material comprises hard chrome.

5. The iron as claimed in claim 3, wherein said projections are triangular in cross-section and the angle formed by said converging sides at said extremities is 80°.

6. The iron as claimed in claim 3, wherein said extremity is round and said converging sides are rounded and blend into said extremity.

7. The iron as claimed in claim 3, wherein said projections are spaced apart from each other.

8. The iron as claimed in claim 7, including a recess between said spaced apart projections, whereby the flow of heat from the iron to the portions of the connector between the channels is reduced.

9. A method for simultaneously soldering a plurality of conductors to a row of spaced metal liners positioned in respective channels of a connector and between barriers of a insulation material, comprising:
   inserting a conductor into each said metal liner;
   covering each said metal liner with a strip of solder;
   melting said solder by the application of a heated iron thereto, said iron including a plurality of projections aligned with the channels of the connector and having converging sides which terminate at a common extremity;
   heating said metal liners by passing the projections of said iron through said solder as it melts to a position such that said extremities are located within said channels and said converging sides contact respective upper edges of said metal liners while remaining spaced from said barriers of insulating material, whereby said melted solder collects in said metal liner in electrical engagement with said conductor; and
   removing said projections from said metal liners to cool said metal liners and solidify said solder therein.

10. The method of claim 9 wherein said metal liners are covered by an elongated, continuous strip of solder.

11. The method of claim 10 wherein the full length of the solder strip between said channels is melted and adheres to said converging sides as it flows into said metal liners.

* * * * *